Figure 1:
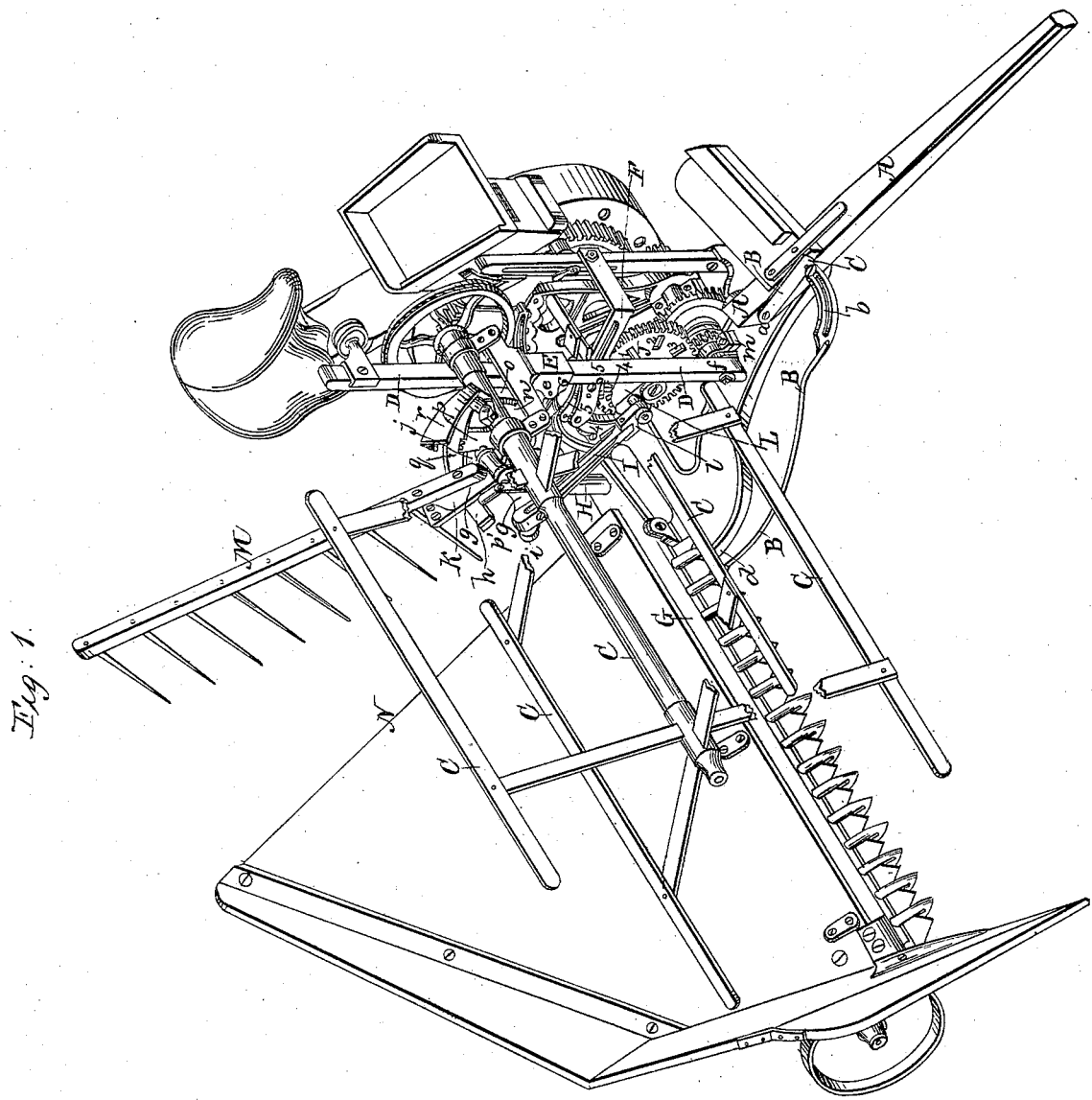

W. A. KIRBY.
Harvester.

No. 42,440.

Patented April 19, 1864.

Witnesses;
J. A. Patton
J. E. Wilson

Inventor;
William A. Kirby.
By atty A. B. Stoughton

UNITED STATES PATENT OFFICE.

WILLIAM A. KIRBY, OF AUBURN, NEW YORK, ASSIGNOR TO HIMSELF AND DAVID M. OSBORNE.

IMPROVEMENT IN HARVESTERS.

Specification forming part of Letters Patent No. 42,440, dated April 19, 1864.

*To all whom it may concern:*

Be it known that I, WILLIAM A. KIRBY, of Auburn, in the county of Cayuga and State of New York, have invented certain new and useful Improvements in Harvesting-Machines; and I do hereby declare that the following is a full, clear, and exact description of the same, reference being had to the accompanying drawing, making a part of this specification, in which the figure represents a perspective view of the machine.

My invention relates to certain mechanism and combinations of mechanism for arranging the grass or grain so that it may be caught by the reel and prevent it from lodging against the frame, inside shoe, and guard next to said shoe for laying it in convenient and proper position upon the platform, and for delivering it in proper bundles or gavels upon the ground.

To enable others skilled in the art to make and use my invention, I will proceed to describe the same with reference to the drawing.

The main frame, driving-gear, and many of the parts connected therewith are the same substantially as those heretofore described, shown and patented to myself and assignee, and need not, as they are shown in the drawing, be here elaborately described.

At or near the heel of the tongue A, I arrange a clearing-rod, B, which is pivoted at $a$, and by means of a slotted arc, $b$, and set-screw $c$, is made adjustable, for a purpose to be hereinafter described. This clearing-rod B is curved outward and downward, so that its extreme loose end, $d$, shall be in close proximity to the inside shoe. Its object and purpose are twofold, viz: When raised up it raises up the leaning heads or stalks and turns them toward the influence of the reel, which in turn brings them to the cutter or sickle, so as to be severed and gathered instead of being dragged down and lost. When down it bears down upon the grass or stubble and causes it to pass underneath the frame and away from the inside shoe and first finger or guard, where it is most liable to lodge.

The reel C is hung upon a single reel-post, D, and may be raised or lowered thereon by means of a saddle, E, and a lever-clamp, $e$, which firmly holds it at its adjusted position. The reel-post D may be leaned, with the reel, more toward or from the crop, as may be required to reach and properly bring the portion to be cut within the influence of the cutters, and for this purpose is pivoted at its heel $f$ and moves against a slotted arc, F, to which it may be clamped when properly adjusted.

In cutting and gathering short crops—such as barley, clover-seed, timothy-heads, or even short grain—the adjustment of the reel is very important, and inasmuch as I use an automatic rake in connection with the reel the adjustment of the rake becomes an essential element to the perfect action of the reel with which it is to work.

On the finger-bar G, or in line with it, I arrange a post, H, upon which the rake-plate $g$ is pivoted and turns, said rake-plate having upon it, beside the arm that carries the friction-roller $h$, an arm, $i$, to which the pitman I that oscillates it is attached, and an arm, $j$, to which the rake-head $k$ is pivoted. The pitman I is connected by a wrist-pin, $l$, to a fast and loose arm, L, that is supported on the axle of a cogged wheel, J, which is driven continuously from a spur-pinion, $m$, on the shaft that carries the gear for operating the reel and cutting apparatus; but while the wheel J is continuously driven it only operates the rake periodically, as the operator may desire or as the standing of the crop may demand, for making bundles or gavels of uniform size, there being a self-acting detaching apparatus and a positive connecting apparatus within the control of the operator that defines the action of the rake, as will be explained. The wheel J has a series of radial slots, 1 2 3, &c., in it, and the arm L has a spring-bolt, 4, in it, which bolt, when not controlled, shoots into one of the radial slots of the wheel J, and so long as it remains there the rake will act, as the arm L is then connected with said wheel; but at every revolution of the wheel J, each revolution causing one sweeping or clearing action of the rake, a wedge or trigger, 5, pushes out the bolt 4 from its slot and holds it out at the will of the operator, and so long as this wedge or trigger remains in its suspended position so long the rake will remain stationary and in or about in the position shown in the drawing. When sufficient material has accumulated upon the platform to make a bundle or gavel the operator, by his foot or otherwise, raises up the rod 6, to which the wedge or trigger 5 is attached, and then the bolt 4 shoots into the first radial slot in the wheel J that comes opposite to it and sets the rake in motion. The trigger having been released as soon as the rake starts, it again throws out the bolt 4 after the arm and wheel have made one entire revolution and the rake has made one sweeping or clearing action over the platform.

The rake-head $k$ is furnished with adjusting-holes 7 8, so that the angle of the rake M may be changed thereon, or so that it may be set forward or back at the same angle or inclination and reach nearer to or farther from the cutter as the kind of crop being cut may require or as the reel may be set to suit the crop, for when the reel is set forward it does not bring the cut crop so far back on the platform, and consequently the rake must reach farther forward. The adjustment of the rake, therefore, when used with an adjustable reel, is highly important. The tail $n$ of the rake-head $k$ has a friction-roller, $o$, upon it, which raises and lowers the rake at the proper times, as follows: On an upright, $p$, there is a pivoted switch, $q$, and a cam-ledge, $r$. The end $p'$ of the switch is the heavier, and consequently causes it to droop at that end. Suppose the rake to be in line with the cutters and upon the platform, and ready to sweep the platform of the cut material upon it, it moves over the platform until it delivers the material at the side N of the platform. At this point the roller $o$ runs up onto the switch $q$, and thence under the cam-ledge $r$, which latter raises up the rake into about the position shown in the drawing, and the roller $r$ having passed the end of the switch, said switch rises at that end by its superior weight at the other, (or by a spring, if preferred,) and the roller then runs under the switch until it passes its pivoted point, holding up the rake; but when it passes that point, then the rake drops into its sweeping position again and repeats the operation.

Having thus fully described the nature and object of my invention, what I claim is—

1. The clearing-rod B, constructed, arranged, and operating as and for the purpose described.

2. The combination of the adjustable clearing-rod, adjustable reel, and adjustable rake for the purpose of adapting the machine to the cutting, gathering, and delivering of ordinary as well as short crops, as herein described and represented.

3. The rake-head $k$, so made as that the rake may be set forward or back thereon, in the manner and for the purpose described.

4. In combination with an intermittent rising and falling and sweeping rake, the overpoised switch and cam-ledge for actuating the same, as set forth.

5. In combination with the wheel J and its radial slots, and the arm L, with its spring-bolt, for operating the rake, the wedge or trigger 5 for disengaging the two at every revolution, substantially as described.

WM. A. KIRBY.

Witnesses:
I. F. TENILL,
HORACE T. COOK.